US012481913B2

United States Patent
Barr et al.

(10) Patent No.: US 12,481,913 B2
(45) Date of Patent: Nov. 25, 2025

(54) AUTOMATIC GENERATION OF ATTRIBUTE SETS FOR COUNTERFACTUAL EXPLANATIONS

(71) Applicant: Capital One Services, LLC, McLean, VA (US)

(72) Inventors: Brian Barr, McLean, VA (US); Christopher Bruss, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 1059 days.

(21) Appl. No.: 17/464,566

(22) Filed: Sep. 1, 2021

(65) Prior Publication Data

US 2023/0066807 A1 Mar. 2, 2023

(51) Int. Cl.
*G06N 20/00* (2019.01)

(52) U.S. Cl.
CPC .................... *G06N 20/00* (2019.01)

(58) Field of Classification Search
CPC .......... G06N 20/00; G06N 3/084; G06N 3/09; G06N 3/04
See application file for complete search history.

(56) References Cited

U.S. PATENT DOCUMENTS

| | | | |
|---|---|---|---|
| 10,896,384 B1 | 1/2021 | Merhav et al. | |
| 2005/0273702 A1* | 12/2005 | Trabucco | G06F 16/958 707/999.001 |
| 2019/0102679 A1 | 4/2019 | Roberts et al. | |
| 2019/0318421 A1 | 10/2019 | Lyonnet et al. | |
| 2020/0065653 A1 | 2/2020 | Meier et al. | |
| 2021/0264234 A1 | 8/2021 | Paris et al. | |
| 2022/0327812 A1* | 10/2022 | Lakatos | G06V 10/7715 |

OTHER PUBLICATIONS

Mahajan, D., Tan, C., & Sharma, A. (2020). Preserving causal constraints in counterfactual explanations for machine learning classifiers. (Year: 2020).*
Grath, R. M., Costabello, L., Van, C. L., Sweeney, P., Kamiab, F., Shen, Z., & Lecue, F. (2018). Interpretable credit application predictions with counterfactual explanations. arXiv preprint arXiv:1811.05245. (Year: 2018).*
Looveren A. & Klaise J. (2020) Interpretable Counterfactual Explanations Guided by Prototypes. arXiv preprint arxiv:1907.02584 (Year: 2020).*

(Continued)

*Primary Examiner* — Li Wu Chang
(74) *Attorney, Agent, or Firm* — Foley & Lardner LLP

(57) ABSTRACT

Methods and systems are described herein for generating updated sets of attributes that would turn a negative decision of an automated system into a positive decision. A received set of attributes associated with a negative decision of an automated system may be used to generate a latent representation of that set of attributes. A machine learning model may then be used to output a change value (an alpha value). The alpha value may represent a minimum change needed to be made to the set of attributes to change the negative decision to a positive decision. The alpha value may then be applied to the latent representation to generate an updated latent representation, which may then be decoded into an updated set of attributes that would generate a positive decision from the automated system.

20 Claims, 8 Drawing Sheets

(56) References Cited

OTHER PUBLICATIONS

Berrada, L., Zisserman, A., & Kumar, M. P. (Nov. 2020). Training neural networks for and by interpolation. In International conference on machine learning (pp. 799-809). PMLR. (Year: 2020).*
Joshi, S., Koyejo, O., Vijitbenjaronk, W., Kim, B., & Ghosh, J. (2019). Towards realistic individual recourse and actionable explanations in black-box decision making systems. arXiv preprint arXiv:1907.09615. (Year: 2019).*
Gomez, O., Holter, S., Yuan, J., & Bertini, E. (Mar. 2020). Vice: Visual counterfactual explanations for machine learning models. In Proceedings of the 25th international conference on intelligent user interfaces (pp. 531-535). (Year: 2020).*
Pawelczyk, M., Broelemann, K., & Kasneci, G. (Apr. 2020). Learning model-agnostic counterfactual explanations for tabular data. In Proceedings of the web conference 2020 (pp. 3126-3132). (Year: 2020).*
Tschannen et al. "Recent Advances in Autoencoder-Based Representation Learning", pp. 25, arXiv:1812.05069v1 [cs.LG] Dec. 12, 2018.*
International Search Report and Written Opinion issued in corresponding International Application No. PCT/US2022/075812 on Dec. 20, 2022 (10 pages).

* cited by examiner

500

| Attribute | Value |
|---|---|
| Salary | 45000 |
| Credit Score | 690 |
| Expenses/month | 2000 |
| Age | 56 |
| Loan Amount | 500000 |

| Attribute | Value |
|---|---|
| Salary | 50000 |
| Credit Score | 750 |
| Expenses/month | 2000 |
| Age | 28 |
| Loan Amount | 500000 |

AUTOMATIC GENERATION OF ATTRIBUTE SETS FOR COUNTERFACTUAL EXPLANATIONS

BACKGROUND

Various decision-making processes have now been moved away from humans to computing devices (e.g., via software). In addition, many new decision processes have been generated because computing software has become very adept at making certain decisions. For example, in order to be able to connect to a computer network, a person or a computing device must have a certain combination or combinations of attributes and if one of the combinations of attributes is not present the computing software may reject the person or computing device from connecting to a network. In many cases there can be a large number of attributes that the computing software processes to make the decision (e.g., 10, 20, 30, 100, etc. attributes). The process may be complex; however, the decision is generally binary (e.g., approval or rejection). When the computing software renders a negative decision (e.g., a rejection), it is useful to also generate one or more sets of attributes that would turn a negative decision into a positive.

SUMMARY

A number of approaches may be used to solve the problem above. For example, a regression algorithm may be used to identify a set of attributes that would turn the negative decision into a positive decision. However, those approaches are usually compute-intensive and/or time intensive. With advances in computer technology, e.g., machine learning technologies, a faster and less compute-intensive mechanism for solving the problems discussed above is disclosed herein.

Therefore, methods and systems are described herein for generating updated sets of attributes that would turn a negative decision of an automated system into a positive decision. A decision decoding system may be used for generating updated sets of attributes. The decision decoding system may use a received set of attributes associated with a negative decision and generate a latent representation of that set of attributes. The decision decoding system may then use a machine learning model to output a change value (referred to herein as an alpha value). The alpha value may represent a minimum change that may be needed to be made to at least one attribute of the set of attributes to change the negative decision to a positive decision. The alpha value may then be applied to the latent representation to generate an updated latent representation, which may then be decoded into an updated set of attributes that would generate a positive decision from the automated system.

In some embodiments, the decision decoding system may receive a set of attributes associated with a negative decision. The negative decision may have been rendered by an automated system based on that set of attributes being input into the automated system. For example, a mobile device may attempt to access a computing network through a wireless gateway. In order to access the computing network, the mobile device may be required, by the wireless gateway, to have one of a combination of attributes (e.g., software versions for various software packages, update versions, etc.). If the mobile device does not have one of the specific combinations, the mobile device may not be allowed to join the computing network.

The decision decoding system may encode the set of attributes into a latent representation. In some embodiments, the decision decoding system may compress the set of attributes into a multi-dimensional value that has less dimensions than a number of attributes in the set of attributes. For example, the encoding operation may be performed using a machine learning model designed to generate latent representations. The latent representation may be demonstrated as a point in a latent space. The points, in the latent space, of latent representations having negative decisions may be located on one side of a boundary while the points of latent representations having positive decisions may be located on another side of a boundary within the latent space.

When the latent representation has been generated, the decision decoding system may input the latent representation into a machine learning model. This machine learning model may be trained to output a corresponding change value (e.g., the alpha value) when a particular latent representation is input into the machine learning model. The change value may represent a minimum change that may be needed to be made to at least one attribute of the set of attributes to change the negative decision to a positive decision. For example, the decision decoding system may input the latent representation associated with the attributes of the mobile device into the machine learning model to receive the alpha value.

The decision decoding system may then obtain, from the machine learning model, an associated change value (i.e., the alpha value) for the set of attributes. In some embodiments the alpha value may also be a multi-dimensional value, while in some embodiments, the alpha value may be a one-dimensional value. The alpha value may be a distance in the latent space between the point representing the set of attributes (e.g., the latent representation) and the boundary line (i.e., the boundary line between latent representations having positive and negative decisions). In some embodiments, the machine learning model may output multiple alpha values with associated probabilities. Thus, the decision decoding system may use multiple alpha values.

The decision decoding system may apply the associated change value (e.g., the alpha value) to the latent representation to generate an updated latent representation. In some embodiments, the decision decoding system may apply the change value to each dimension of the multi-dimensional value. However, in some embodiments, the decision decoding system may apply the alpha value to one or more dimensions. In some embodiments, the decision decoding system may perform a linear interpolation operation based on the associated change value, the latent representation and a given latent representation having the positive decision to determine the updated latent representation.

The decision decoding system may then decode the latent representation into an updated set of attributes. The decoding operation may be performed by a machine learning model. For example, the decoding operation may be performed by the same machine learning model that performs the encoding operation. In some embodiments, the updated set of attributes may not be useful to the user. Thus, in these instances, other alpha values (e.g., those other alpha values output by the machine learning model) may be used. For example, the updated set of attributes may indicate that in order to be allowed to access the computing network, the mobile device must have a different hardware version. That would not be useful information because it may not be possible for a user to change a hardware version of the mobile device. Thus, the decision decoding system may use other alpha values output by the machine learning model to identify an updated set of attributes that would enable the mobile device to access the computing network.

The decision decoding system may then provide the updated set of attributes for review by a user. For example, the decision decoding system may generate for display on the mobile device the set of attributes highlighting to the user which attributes may be changed and by how much. One attribute that may require changing is a software version of a particular software package. Thus, the user may be able to download an update to the particular software package and install it on the mobile device.

In some embodiments, the decision decoding system may train the machine learning model using the plurality of latent representations and the plurality of change values to output a corresponding change value for a received latent representation. The decision decoding system may receive a training dataset that includes a plurality of records. Each record may include a plurality of attributes of a corresponding user, and each record may be associated with a corresponding negative decision received from the automated system based on a corresponding plurality of attributes. In some embodiments, each record may include attributes associated with a computing device (e.g., for accessing a network). Thus, each record may include attributes associated with a quality control process. Thus, each record may include attributes associated with any entity. In some embodiments, the training dataset may include negative decisions (e.g., rejections) for a plurality of mobile devices to access a computing network. The decision decoding system may encode the plurality of records into a plurality of latent representations (e.g., using a machine learning model for latent representation encoding).

The decision decoding system may generate for the plurality of latent representations a plurality of change values such that applying a change value to a corresponding latent representation having the corresponding negative decision causes the latent representation to now have a corresponding positive decision. The decision decoding system may perform the generating operation by averaging known positive latent representations to create an average positive latent representation and then use a function (e.g., linear interpolation) to generate each change value (e.g., the alpha value). Specifically, the decision decoding system may retrieve a plurality of positive latent representations. Thus, each latent representation may be associated with attributes known to receive a positive decision from the automated system. The decision decoding system may determine an average latent representation from the plurality of positive latent representations, and generate a training change value (e.g., an alpha value) for each latent representation based on the average latent representation.

In some embodiments, to generate the latent representations the decision decoding system may use another machine learning model. That machine learning model may be a machine learning model trained to generate latent representations on attribute sets with positive decisions. Thus, the latent representation would be a mirror latent representation on the other side of the boundary in the latent space, discussed above. The decision decoding system may then train, using the plurality of latent representations and the plurality of change values, the machine learning model to output a corresponding change value for a received latent representation.

Various other aspects, features and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data), unless the context clearly dictates otherwise.

BRIEF DESCRIPTION OF THE DRAWINGS

FIG. 5 illustrates an updated set of attributes in accordance with one or more embodiments.

FIG. 6 illustrates another updated set of attributes, in accordance with one or more embodiments.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
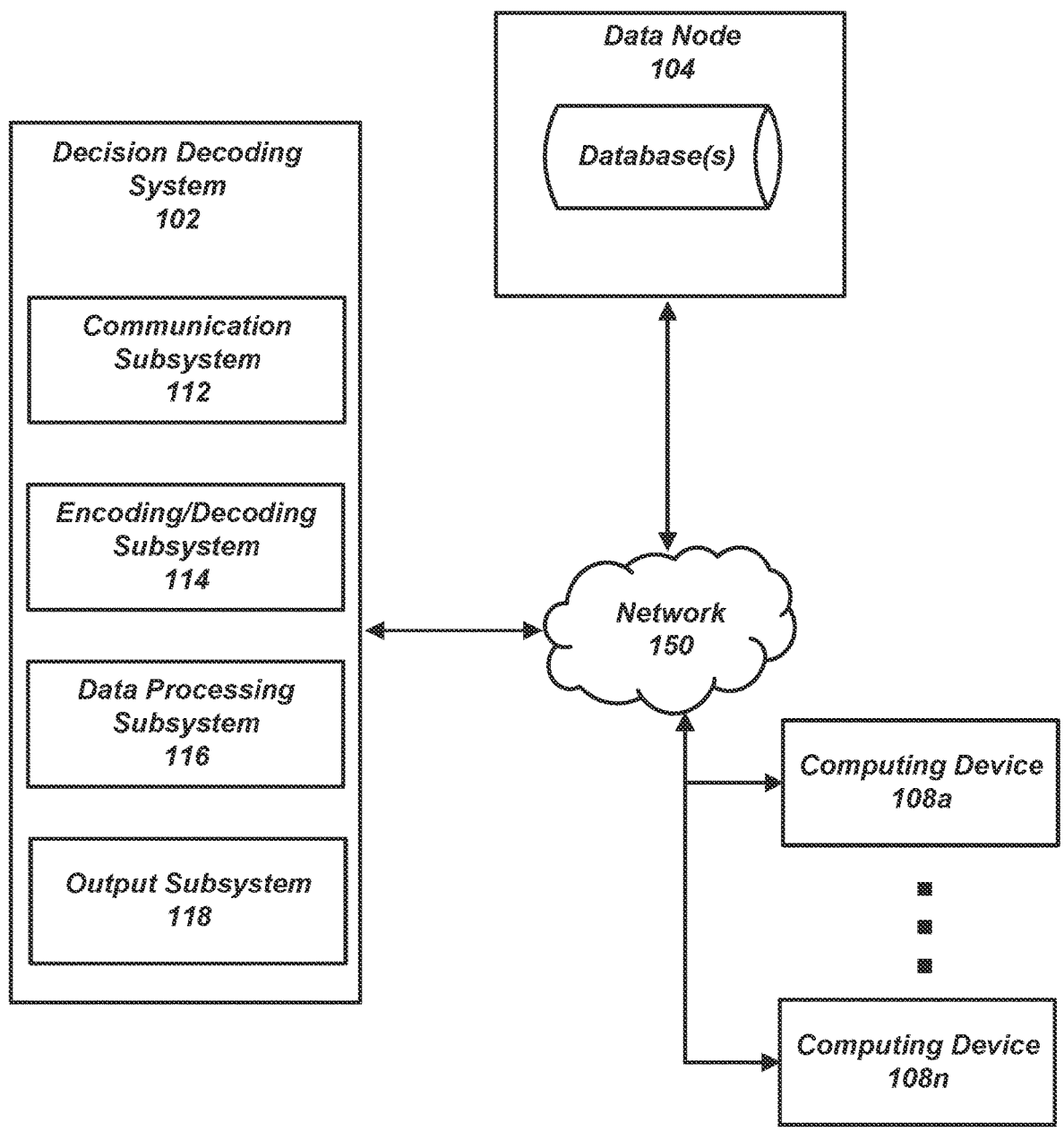
FIG. 1 shows an illustrative system for generating updated sets of attributes that would turn a negative decision of an automated system into a positive decision, in accordance with one or more embodiments of this disclosure.

FIG. 1 shows environment 100, which includes a system for generating updated sets of attributes that would turn a negative decision of an automated system into a positive decision. Environment 100 includes decision decoding system 102, data node 104, and computing devices 108a-108n. Decision decoding system 102 may execute instructions for generating updated sets of attributes that would turn a negative decision of an automated system into a positive decision. Decision decoding system 102 may include software, hardware or a combination of the two. For example, decision decoding system 102 may be a physical server or a virtual server that is running on a physical computer system.

Data node 104 may store various data, including different training datasets, machine learning models, and other suitable data. In some embodiments, data node 104 may also be used to train the machine learning models. Data node 104 may include software, hardware, or a combination of the two. For example, data node 104 may be a physical server, or a virtual server that is running on a physical computer system. Network 150 may be a local area network, a wide area network (e.g., the Internet), or a combination of the two. Computing devices 108a-108n may include end-user computing devices (e.g., desktop computers, laptops, electronic tablets and/or other computing devices used by end users).

Decision decoding system 102 may be configured to receive a set of attributes associated with a negative decision. For example, the set of attributes may be associated with a user that received a negative decision from an automated system based on the set of attributes. For example, a user may have filled out a form (e.g., on a website using a mobile device or a computing device) to apply for a particular product. Decision decoding system 102 may receive the set of attributes using communication subsystem 112. In some embodiments, the set of attributes may be an electronic file (e.g., an XML file) that includes the data in a form of rows and columns. In some embodiments, the set of attributes may be received from data node 104 that is hosting a database system for storing the attribute sets. In some embodiments, decision decoding system 102 may receive the set of attributes from any of computing devices 108a-108n.

Communication subsystem 112 may include software components, hardware components, or a combination of both. For example, communication subsystem 112 may include a network card (e.g., a wireless network card and/or a wired network card) that is coupled with software to drive the card. Communication subsystem 112 may store the received set of attributes in memory in preparation for other operations. Communication subsystem 112 may pass the received set of attributes, or a pointer to the set of attributes stored in memory, to encoding/decoding subsystem 114.

Figure 2:
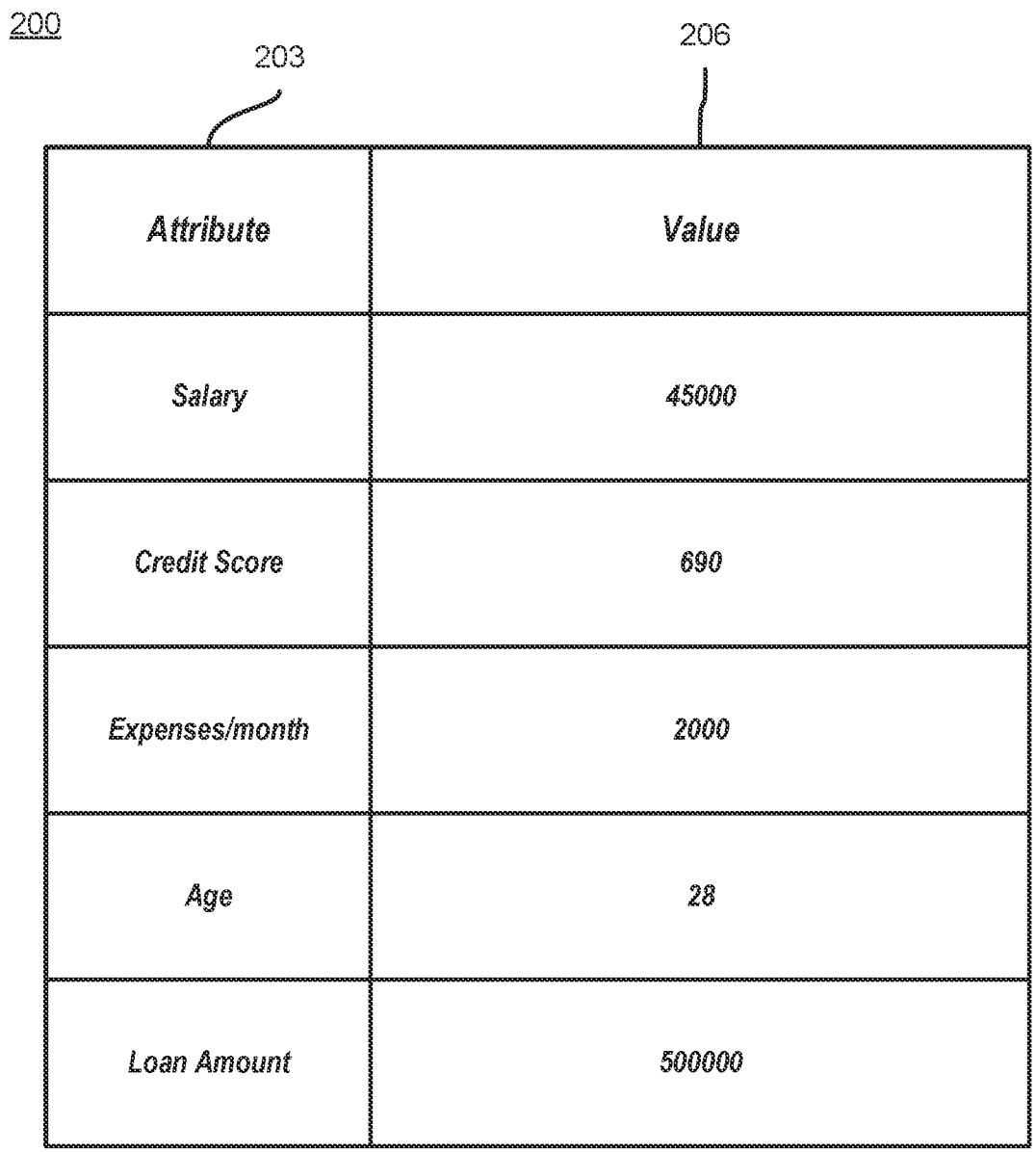
FIG. 2 illustrates a data structure that may include a set of attributes, in accordance with one or more embodiments of this disclosure.

Encoding/decoding subsystem 114 may include software components, hardware components, or a combination of both. For example, encoding/decoding subsystem 114 may include software components that access the attributes in memory and/or storage, and may use one or more processors to perform its operations. Encoding/decoding subsystem 114 may receive the set of attributes from communication subsystem 112. FIG. 2 illustrates a data structure 200 that may include a set of attributes. Column 203 may include the attribute identifier illustrated as a name of the attribute and column 206 includes the value of the attribute.

Encoding/decoding subsystem 114 may encode the set of attributes into a latent representation. In some embodiments, encoding the set of attributes into the latent representation includes compressing the set of attributes into a multi-dimensional value that has less dimensions than a number of attributes in the set of attributes. In some embodiments, the multi-dimensional value may be in a form of a vector or another suitable data structure. When the latent representation of the set of attributes is generated, encoding/decoding subsystem 114 may pass the latent representation to data processing subsystem 116.

Data processing subsystem 116 may receive the latent representations and perform further processing. Data processing subsystem 116 may include software components, hardware components, or a combination of both. For example, data processing subsystem 116 may include software components that access the attributes in memory and/or storage, and may use one or more processors to perform its operations. Data processing subsystem 116 may store and/or access a machine learning model trained to output a corresponding change value (e.g., an alpha value discussed above) when a particular latent representation is input into the machine learning model. Each change value may represent a minimum change needed to be made to the set of attributes to change the negative decision to a positive decision. In some embodiments, the machine learning model may be stored on data node 104 and may be accessed through an application programming interface. For example, data processing subsystem 116 may transmit a command to data node 104 with a particular set of attributes to be submitted to the machine learning model.

The machine learning model may be trained to output a corresponding change value (e.g., an alpha value discussed above) when a particular latent representation is input into the machine learning model. The training may be performed using decision decoding system 102 or another system e.g., a training system (not shown) that may reside on data node 104 or at another location. The training system may receive a training dataset that includes a plurality of records. Each record may include a plurality of attributes of a corresponding user, and each record may be associated with a corresponding negative decision received from an automated system based on a corresponding plurality of attributes. In some embodiments, each record may include the attributes illustrated in FIG. 2.

Figure 3:
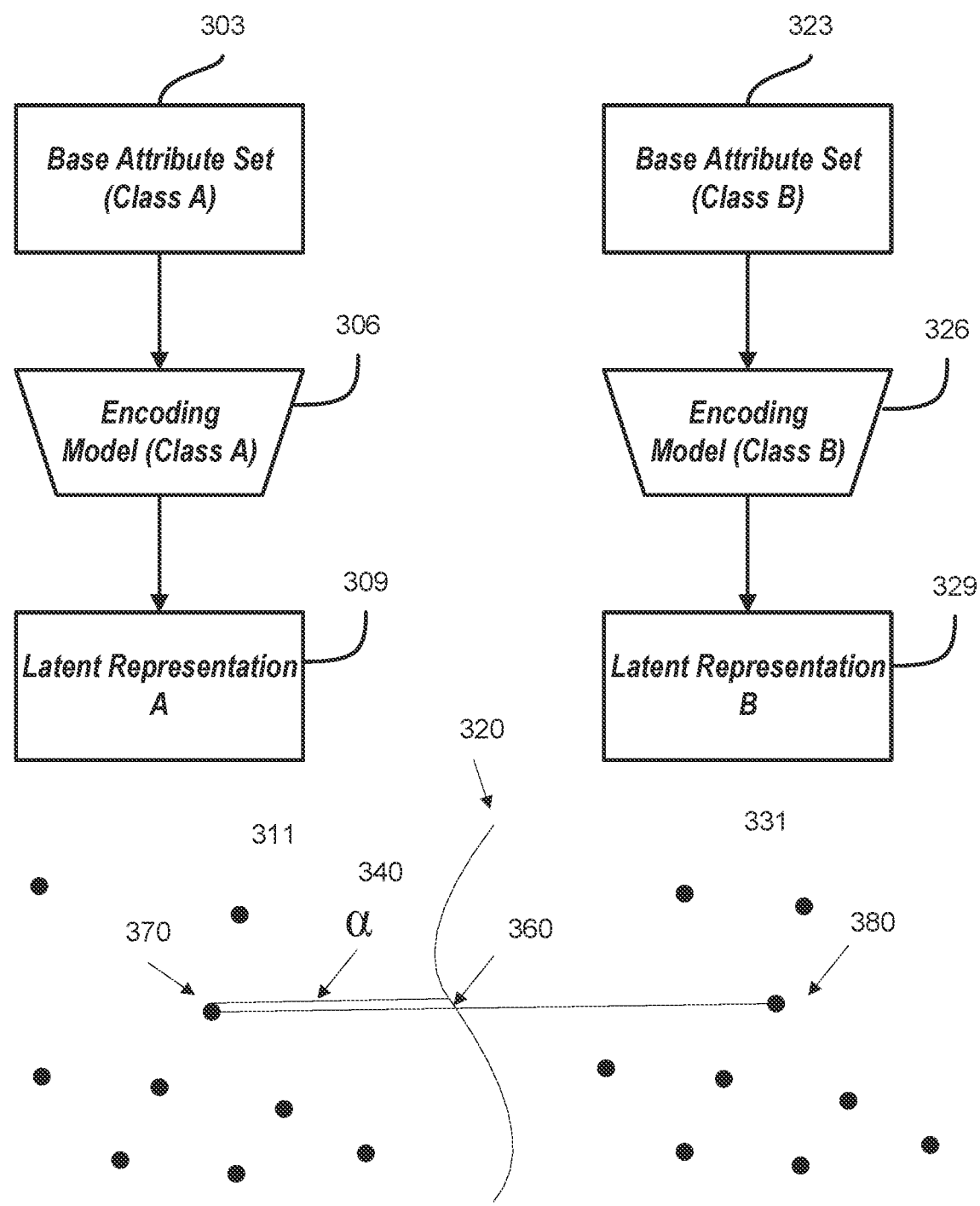
FIG. 3 illustrates the encoding process and the results of the encoding process, in accordance with one or more embodiments.

The training system may encode the plurality of records into a plurality of latent representations. FIG. 3 illustrates the encoding process 300 and the results of the encoding process. The encoding processes may be parallel for attribute sets that are associated with positive decisions and attribute sets associated with negative decisions. For example, the training system may train two machine learning models for outputting latent representations based on attribute sets associated with negative decisions (referred to as Class A in FIG. 3) and latent representations based on attribute sets associated with positive decisions (referred to as class B in FIG. 3). Thus, base attribute set (class A) 303 in FIG. 3 is associated with a negative decision of the automated system while base attribute set (class B) 323 is associated with a positive decision of the automated system. Model 306 represents an encoding model for encoding attribute sets having negative decisions, while encoding model 326 represents an encoding model for encoding attribute sets having positive decision. Thus, encoding model 303 may be trained using attribute sets having negative decisions and encoding model 323 may be trained using attribute sets having positive decisions. Thus, each received record of the training dataset may be input into encoding model 306 to arrive at a latent representation (A) 309.

In some embodiments, encoding model 326 may have been trained using attribute sets having positive decisions from the automated system. Furthermore, the training system may have used encoding model 326 to generate a plurality of latent representations 329 (i.e., from attribute sets associated with positive decisions). As illustrated in FIG. 3, each latent representation may be represented as a point in latent space. Points 311 correspond to latent representations for attribute sets associated with negative decisions, while points 331 correspond to latent representations for attribute sets associated with positive decisions. Line 320 corresponds to a boundary in latent space between representations having positive decisions and representations having negative decisions. Thus, the sets of attributes received as part of the training dataset may be illustrated by points 311.

The training system may generate, for the plurality of latent representations, a plurality of change values (e.g., alpha values) such that applying a change value to a corresponding latent representation having the corresponding negative decision causes the latent representation to now have a corresponding positive decision. The change value is illustrated by alpha distance 340 in FIG. 3. Thus, the training system may generate an alpha value for each point in latent space, each point representing a set of attributes having a negative decision. To generate the alpha value for a particular point, the training system may use one of a plurality of mechanisms.

These mechanisms may use latent representations associated with positive decisions of the automated system. For example, the training system may retrieve a plurality of positive latent representations. Each latent representation may be associated with a set of attributes of known to receive the positive decision from the automated system. Those latent representations may be illustrated by points 331 in FIG. 3. The training system may determine an average latent representation from the plurality of positive latent representations and generate a training change value based on the average latent representation and each of the plurality of latent representations. The averaging operation may be performed using an averaging function or may be performed by averaging each attribute within the attribute sets associated with positive decisions of the automated system.

Once the average operation has been performed and an average latent representation has been generated, the training system may generate alpha value for an alpha distance 340 based on the two points in the latent space (the point in latent space corresponding to the latent representation and the point in latent space corresponding to the average latent representation).

In some embodiments, the training system may use another mechanism to generate a point in the latent space corresponding to attribute sets associated with positive decisions. The training system may input the attribute set associated with a positive decision into encoding model 326 to generate a mirror point for the latent representation associated with a negative decision. The mirror point would be located in latent space representing attribute sets with positive decisions. That is, the training system may input into a latent representation generating machine learning model a first set of attributes. The latent representation generating machine learning model is a model that has been trained to generate latent representations for attribute sets associated with positive decisions of the automated system. However, the first set of attributes is associated with the negative decision of the automated system. The training system may then obtain from the latent representation generating machine learning model, a first latent representation for the first set of attributes, and generate a training change value based on the first latent representation and each of the plurality of latent representations.

In some embodiments, the training system may use a different mechanism for selecting a point on the positive side of latent space. For example, the training system may use a set of attributes associated with a positive decision and encode that set of attributes using, for example, encoding model 326. Once the point is selected, the training system may generate the alpha value for that point. The training system may determine the alpha value by moving on the line between the two points and obtaining decisions from the automated system. When a positive decision is received from the automated system the alpha value may be generated.

When the alpha values for all sets of attributes in the training dataset have been generated, the training system may train, using the plurality of latent representations and the plurality of change values (alpha values), the machine learning model to output a corresponding change value (alpha value) for a received latent representation. Once the machine learning model has been trained, the machine learning model may be used to process sets of attributes to obtain alpha values.

Figure 4:
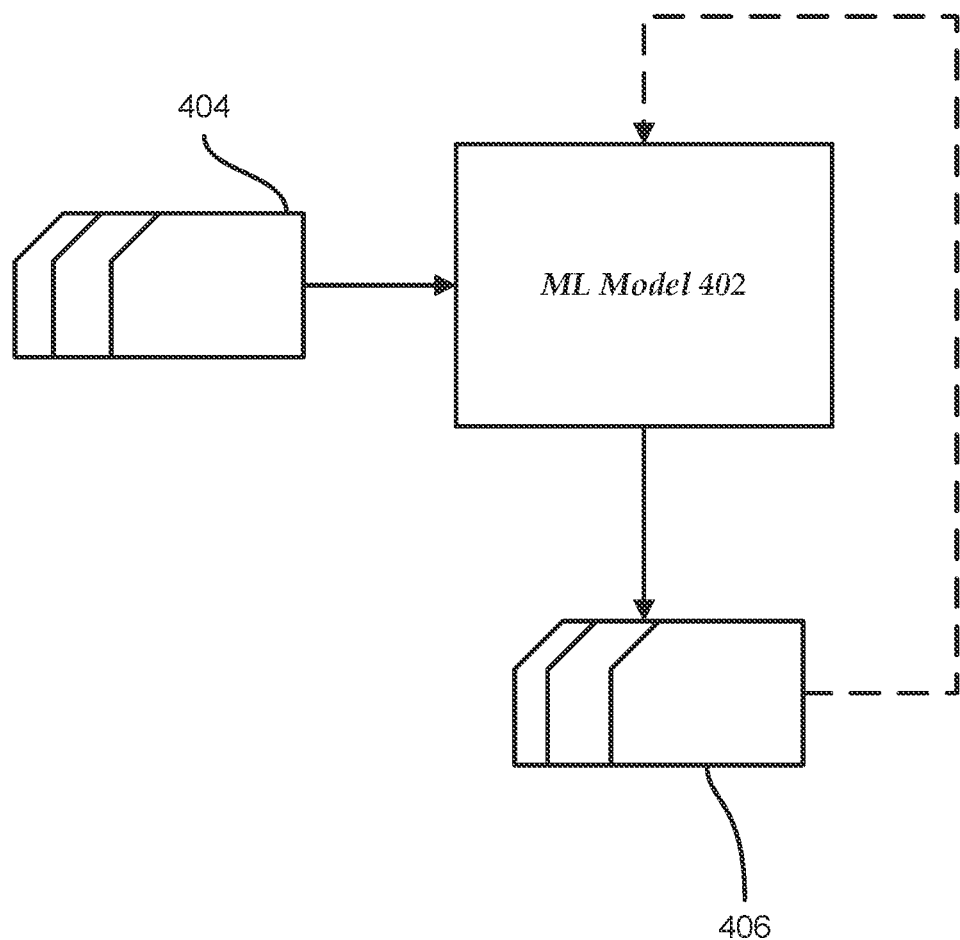
FIG. 4 illustrates an exemplary machine learning model, in accordance with one or more embodiments.

FIG. 4 illustrates an exemplary machine learning model. Machine learning model 402 may take input 404 (e.g., a vector representing a particular latent representation) and may output a corresponding alpha value 406 with a corresponding probability. In some embodiments, the output parameters may be fed back to the machine learning model as input to train the machine learning model (e.g., alone or in conjunction with user indications of the accuracy of outputs, labels associated with the inputs, or with other reference feedback information). The machine learning model may update its configurations (e.g., weights, biases, or other parameters) based on the assessment of its prediction (e.g., of an information source), and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

Now turning back to the mechanism for generating updated sets of attributes, data processing subsystem 116 may obtain, from the machine learning model, an associated change value (i.e., the alpha value) for the set of attributes that has been input into the machine learning model. In some embodiments, data processing subsystem 116 may obtain multiple associated change values. Those change values may include corresponding probabilities and may be used if a particular change value (alpha value) cannot be used. For example, the alpha value may not be used if a counterfactual explanation based on that alpha value suggests that a characteristic is changed that cannot be changed. For example, a person's age, a computing device's hardware version, a current date/time etc.

Data processing subsystem 116 may apply the associated change value to the latent representation to generate an updated latent representation. For example, data processing subsystem 116 may perform a linear interpolation operation based on the associated change value, the latent representation and a given latent representation having the positive decision. One example of the linear interpolation function is illustrated with the equation below:

$$Z_{cf} = \alpha Z_a + (1-\alpha) Z_b$$

Where $Z_{cf}$ is a point on the boundary, in latent space, that separates latent space associated with negative decisions and the positive decisions and is also an updated latent representation, $\alpha$ is the change value, $Z_a$ is a point in the latent space corresponding to the latent representation of the received set of attributes, and $Z_b$ is a point corresponding to a latent representation in the latent space corresponding to attribute sets having positive decisions. In FIG. 3, point 360 corresponds to $Z_{cf}$, point 370 corresponds to $Z_a$ and point 380 corresponds to $Z_b$.

As discussed above, in some embodiments, the latent representation may be a multi-dimensional value and applying the alpha value may include applying the alpha value to every dimension of the multi-dimensional value. In some embodiments, however, data processing subsystem 116 may apply the alpha value to one or more dimensions of the multi-dimensional value.

Data processing subsystem 116 may decode the latent representation into an updated set of attributes. For example, data processing subsystem 116 may pass the updated latent representation to encoding/decoding subsystem 114, which may perform the decoding operation. In some embodiments, encoding model 306 (FIG. 3) may be used to decode the updated latent representation. In some embodiments, after the decoding operation, encoding/decoding subsystem 114 may pass the updated set of attributes back to data processing subsystem 116.

Data processing subsystem 116 may determine that an updated set of attributes includes an updated value that is impossible to change (e.g., a person's age). Data processing subsystem 116 may receive for every set of attributes one or more indicators indicating which attributes are ones that may not be changed (e.g., impossible to change). FIG. 5 illustrates an updated set of attributes 500 (e.g., updated from the attributes of FIG. 2). FIG. 5 illustrates that the age of a person has to change from 28 to 56 to receive a positive decision. That is not possible, thus, data processing subsystem 116 may select a different alpha value. Accordingly, data processing subsystem 116 may determine that the first updated latent representation requires the user to change an attribute that is not changeable and, in response to determining that the first updated latent representation requires the user to change the attribute that is not changeable, apply a different associated change value to the latent representation. Thus, data processing subsystem 116 may select another alpha value (e.g., based on probability for the alpha value) received from the machine learning model and apply that alpha value to the latent representation. FIG. 6 illustrates an updated set of attributes 600. Values 603 and 606 illustrate updated values that are changeable, e.g., within a short amount of time. In some embodiments, where data processing subsystem 116 may determine that the alpha value requires a change in an attribute that is unchangeable, data processing subsystem may record that determination and output the determination together with the updated set of attributes, when output is generated.

In some embodiments, data processing subsystem 116 may generate multiple updated attribute sets. For example, data processing subsystem 116 may receive a plurality of alpha values and generate a plurality of updated latent representations based on the plurality of alpha values (e.g., each alpha value would have a corresponding updated latent representation). Data processing subsystem 116 may then generate an updated attribute set for each alpha value, thus, generating a plurality of updated attribute sets. Those update attribute sets may indicate different changes from the original attribute set. For example, one updated attribute set may indicate that a first attribute may need to change. Another updated attribute set may indicate that a second attribute may need to change. Yet another updated attribute set may indicate that a combination of the first and the second attributes may need to change. Those indications may be provided to a user together with output. For example, the user may receive a difference of one or more attributes, and/or both updated sets of attribute sand the original set of attributes. That is, the user may be presented with multiple counterfactual explanations.

Data processing subsystem 116 may pass the updated set of attributes to output subsystem 118. Output subsystem 118 may provide the updated set of attributes for review by a user. For example, output subsystem 118 may pass the output generated based on the updated set of attributes to communication subsystem 112 with an instruction to transmit the output to a user device, e.g., a computing device from computing devices 108*a*-108*n*. In some embodiments, output subsystem 118 may encrypt the set of attributes to transmit those attributes to the user (e.g., via electronic mail). In some embodiments, output subsystem 118 may generate a link to the update set of attributes. Output subsystem 118 may also generate a web page with the set of attributes and store that web page on data node 104. The link may be provided to the user and may access the web page on data node 104.

Computing Environment

Figure 7:
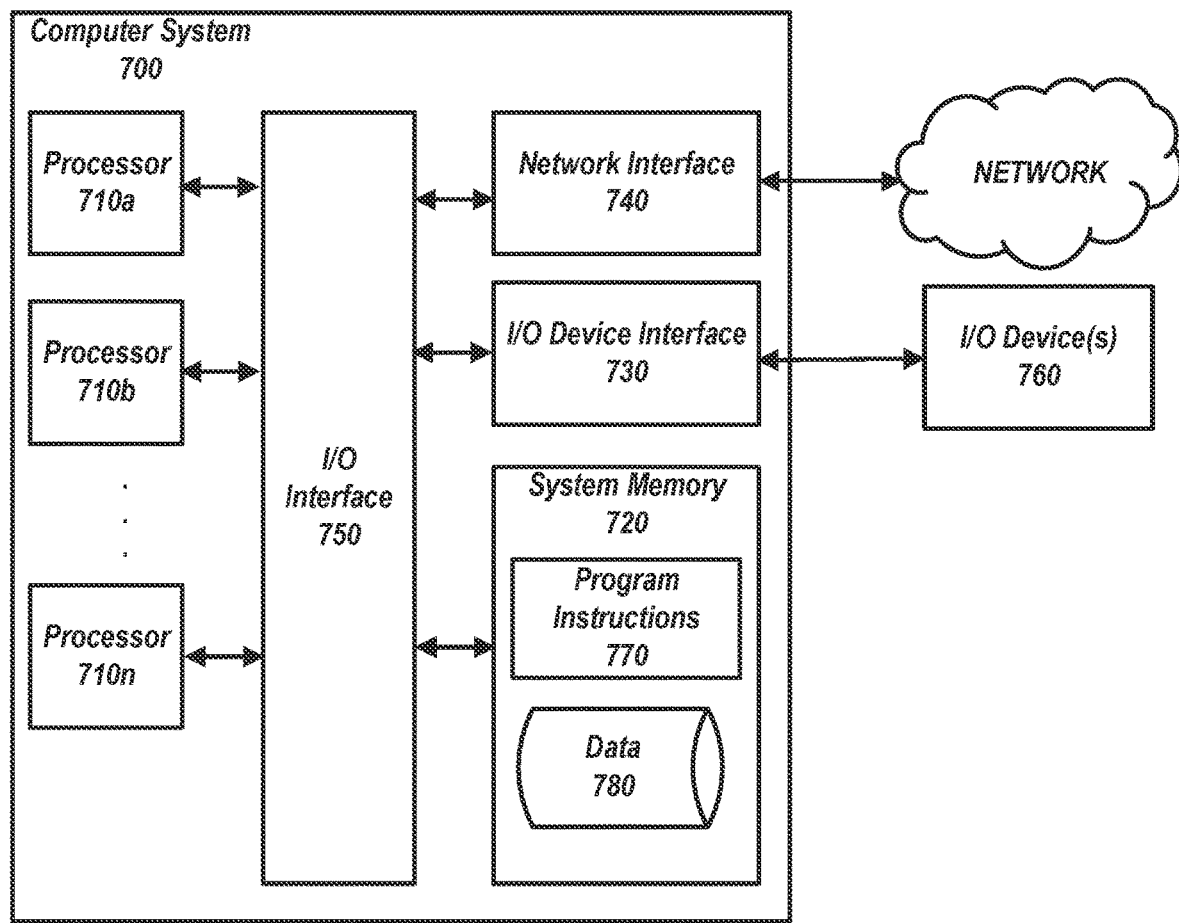
FIG. 7 shows an example computing system that may be used in accordance with one or more embodiments.

FIG. 7 shows an example computing system that may be used in accordance with some embodiments of this disclosure. In some instances, computing system 700 is referred to as a computer system. A person skilled in the art would understand that those terms may be used interchangeably. The components of FIG. 7 may be used to perform some or all operations discussed in relation with FIGS. 1-6. Furthermore, various portions of the systems and methods described herein may include or be executed on one or more computer systems similar to computing system 700. Further, processes and modules described herein may be executed by one or more processing systems similar to that of computing system 700.

Computing system 700 may include one or more processors (e.g., processors 710a-710n) coupled to system memory 720, an input/output I/O device interface 730, and a network interface 740 via an input/output (I/O) interface 750. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 700. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 720). Computing system 700 may be a uni-processor system including one processor (e.g., processor 710a), or a multi-processor system including any number of suitable processors (e.g., 710a-710n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 700 may include a plurality of computing devices (e.g., distributed computer systems) to implement various processing functions.

I/O device interface 730 may provide an interface for connection of one or more I/O devices 760 to computer system 700. I/O devices may include devices that receive input (e.g., from a user) or output information (e.g., to a user). I/O devices 760 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 760 may be connected to computer system 700 through a wired or wireless connection. I/O devices 760 may be connected to computer system 700 from a remote location. I/O devices 760 located on remote computer systems, for example, may be connected to computer system 700 via a network and network interface 740.

Network interface 740 may include a network adapter that provides for connection of computer system 700 to a network. Network interface 740 may facilitate data exchange between computer system 700 and other devices connected to the network. Network interface 740 may support wired or wireless communication. The network may include an electronic communication network, such as the Internet, a local area network (LAN), a wide area network (WAN), a cellular communications network, or the like.

System memory 720 may be configured to store program instructions 770 or data 780. Program instructions 770 may be executable by a processor (e.g., one or more of processors 710a-710n) to implement one or more embodiments of the present techniques. Instructions 770 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site, or distributed across multiple remote sites and interconnected by a communication network.

System memory 720 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 720 may include a non-transitory computer readable storage medium that may have program instructions stored thereon that are executable by a computer processor (e.g., one or more of processors 710a-710n) to cause the subject matter and the functional operations described herein. A memory (e.g., system memory 720) may include a single memory device and/or a plurality of memory devices (e.g., distributed memory devices).

I/O interface 750 may be configured to coordinate I/O traffic between processors 710a-710n, system memory 720, network interface 740, I/O devices 760, and/or other peripheral devices. I/O interface 750 may perform protocol, timing, or other data transformations to convert data signals from one component (e.g., system memory 720) into a format suitable for use by another component (e.g., processors 710a-710n). I/O interface 750 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 700, or multiple computer systems 700 configured to host different portions or instances of embodiments. Multiple computer systems 700 may provide for parallel or sequential processing/execution of one or more portions of the techniques described herein.

Those skilled in the art will appreciate that computer system 700 is merely illustrative, and is not intended to limit the scope of the techniques described herein. Computer system 700 may include any combination of devices or software that may perform or otherwise provide for the performance of the techniques described herein. For example, computer system 700 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 700 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 8:
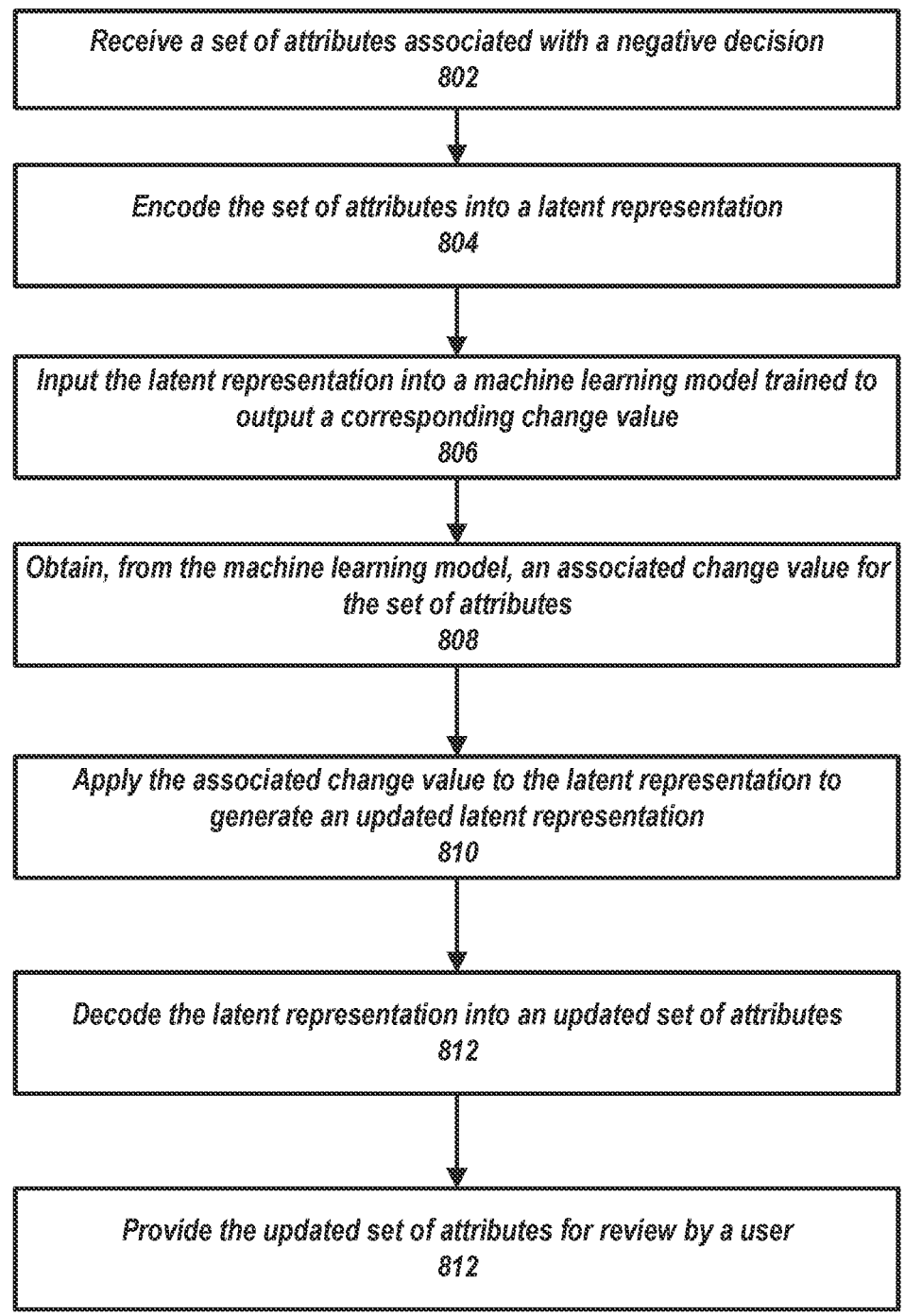
FIG. 8 is a flowchart of operations for generating updated sets of attributes that would turn a negative decision of an automated system into a positive decision, in accordance with one or more embodiments.

FIG. 8 is a flowchart 800 of operations for generating updated sets of attributes that would turn a negative decision of an automated system into a positive decision. The operations of FIG. 8 may use components described in relation to FIG. 7. In some embodiments, inspection system 102 may include one or more components of computer system 700. At 802, decision decoding system 102 receives a set of attributes associated with a negative decision. For example, the decision decoding system may receive the set of attributes from data node 104 and/or from one of computing devices 108a-108n. Decision decoding system 102 may receive the set of attributes over network 150 using network interface 740.

At 804, decision decoding system 102 encodes the set of attributes into a latent representation. Decision decoding system 102 may use one or more processors 710a, 710b, and/or 710n to perform the encoding operation. At 806, decision decoding system 102 inputs the latent representation into a machine learning model trained to output a corresponding change value. For example, decision decoding system 102 may use one or more processors 710a-710n to perform the input operation. The machine learning model may be located at decision decoding system 102. However, in instances when the machine learning model is located away from the decision decoding system (e.g., at data node 104), decision decoding system may use network interface 740 to transmit an input command with the input using a network (e.g., network 150).

At 808, decision decoding system 102 obtains, from the machine learning model, an associated change value for the set of attributes. Inspection system 102 may obtain the change value and store it in system memory 720 (e.g., as part of data 780). For example, the machine learning model may be stored in a location away from the decision decoding system (e.g., at data node 104). Thus, decision decoding system 102 may receive the change value(s) from data node 104 over network 150 using network interface 740. At 810, decision decoding system 102 applies the associated change value to the latent representation to generate an updated latent representation. Decision decoding system 102 may use one or more processors (e.g., processor 710a) to perform this operation.

At 812, decision decoding system 102 decodes the latent representation into an updated set of attributes. Decision decoding system 102 may use one or more processors (e.g., processor 710a) to perform this operation. At 814, decision decoding system 102 provides the updated set of attributes for review by a user. For example, decision decoding system 102 may use one or more processors (e.g., processor 710a, 710b, and or 710n) to perform the operation. In some embodiments, decision decoding system 102 may use I/O device interface 730 to provide the updated set of attributes to an I/O device 760 (e.g., a display). In some embodiments, decision decoding system 102 may transmit the updated set of attributes to another computing device (e.g., data node 104) using network interface 740.

Although the present invention has been described in detail for the purpose of illustration based on what is currently considered to be the most practical and preferred embodiments, it is to be understood that such detail is solely for that purpose, and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating updated sets of attributes, the method comprising: receiving a set of attributes associated with a negative decision; encoding the set of attributes into a latent representation; inputting the latent representation into a machine learning model trained to output a corresponding change value when a particular latent representation is input into the machine learning model, wherein each change value represents a minimum change needed to be made to the set of attributes to change the negative decision to a positive decision; obtaining, from the machine learning model, an associated change value for the set of attributes; applying the associated change value to the latent representation to generate an updated latent representation; decoding the latent representation into an updated set of attributes; and providing the updated set of attributes for review by a user.

2. Any of the proceeding embodiments, further comprising: receiving a training dataset comprising a plurality of records, wherein each record comprises a plurality of attributes of a corresponding user, and wherein each record is associated with a corresponding negative decision received from an automated system based on a corresponding plurality of attributes; encoding the plurality of records into a plurality of latent representations; generating, for the plurality of latent representations, a plurality of change values, wherein applying a change value to a corresponding latent representation having the corresponding negative decision causes the latent representation to now have a corresponding positive decision; and training, using the plurality of latent representations and the plurality of change values, the machine learning model to output a corresponding change value for a received latent representation.

3. Any of the proceeding embodiments, wherein generating, for the plurality of latent representations, the plurality of change values comprises: retrieving a plurality of positive latent representations, wherein each latent representation of the plurality of positive latent representations is associated with attributes known to receive the positive decision from the automated system; determining an average latent representation from the plurality of positive latent representations; and generating a training change value based on the average latent representation and each of the plurality of latent representations.

4. Any of the proceeding embodiments, wherein generating, for the plurality of latent representations, the plurality of change values comprises: inputting into a latent representation generating machine learning model a first set of attributes, wherein the latent representation generating machine learning model has been trained to generate latent representations for attribute sets associated with positive decisions of the automated system, and wherein the first set of attributes is associated with the negative decision of the automated system; obtaining from the latent representation generating machine learning model, a first latent representation for the first set of attributes; and generating a training change value based on the first latent representation and each of the plurality of latent representations.

5. Any of the proceeding embodiments, wherein applying the associated change value to the latent representation to generate the updated latent representation comprises performing a linear interpolation operation based on the associated change value, the latent representation and a given latent representation having the positive decision.

6. Any of the proceeding embodiments, wherein encoding the set of attributes into the latent representation comprises compressing the set of attributes into a multi-dimensional value.

7. Any of the proceeding embodiments, further comprising applying the associated change value to each dimension of the multi-dimensional value.

8. Any of the proceeding embodiments, further comprising: determining that the first updated latent representation requires the user to change an attribute that is not changeable; and in response to determining that the first updated latent representation requires the user to change the attribute that is not changeable, applying a different associated change value to the latent representation.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:

1. A system for accessing a computing network, the system comprising:
one or more processors; and
one or more non-transitory computer-readable storage media storing instructions, which when executed by the one or more processors cause the one or more processors to:
receive a set of attributes associated with a user device, wherein the user device received a negative decision from an automated system based on the set of attributes in connection with a request from the user device to access the computing network,
wherein an attribute, of the set of attributes, indicates a software version of a software package used by the user device;
encode, using an encoding-decoding system, the set of attributes into a latent representation, wherein encoding the set of attributes into the latent representation comprises compressing the set of attributes into a multi-dimensional value that has less dimensions than a number of attributes in the set of attributes;
pass the latent representation from the encoding-decoding system to a data processing system;
input, using the data processing system, the latent representation into a machine learning model to obtain an associated change value for the set of attributes, wherein the machine learning model is trained, using a plurality of latent representations and a plurality of change values, to output, for a received latent representation, a corresponding change value, and wherein each change value represents a minimum change needed to be made to the set of attributes to change the negative decision to a positive decision;
apply, using the data processing system, the associated change value to one or more dimensions of the latent representation to generate an updated latent representation;
pass the updated latent representation from the data processing system to the encoding-decoding system;
decode, using the encoding-decoding system, the latent representation into an updated set of attributes,
wherein an updated attribute, of the updated set of attributes, indicates an updated software version of the software package; and
transmit, to the user device, the updated software version of the software package for installation on the user device for the user device to access the computing network.

2. The system of claim 1, wherein the instructions for applying the associated change value to the one or more dimensions further cause the one or more processors to apply the associated change value to each dimension of the multi-dimensional value.

3. The system of claim 1, wherein the instructions further cause the one or more processors to:
receive a training dataset comprising a plurality of records, wherein each record comprises a plurality of attributes of a corresponding user, and wherein each record is associated with a corresponding negative decision received from the automated system based on a corresponding plurality of attributes;
encode the plurality of records into the plurality of latent representations;
generate, for the plurality of latent representations, the plurality of change values, wherein applying a change value to a corresponding latent representation having the corresponding negative decision causes the corresponding latent representation to now have a corresponding positive decision; and
train, using the plurality of latent representations and the plurality of change values, the machine learning model to output, for the received latent representation, the corresponding change value.

4. The system of claim 3, wherein the instructions for generating, for the plurality of latent representations, the plurality of change values cause the one or more processors to:

retrieve a plurality of positive latent representations, wherein each latent representation of the plurality of positive latent representations is associated with attributes known to receive a positive decision from the automated system;

determine an average latent representation from the plurality of positive latent representations; and generate a training change value based on the average latent representation and each of the plurality of latent representations.

5. A method for accessing a computing network, the method comprising:

receiving a set of attributes associated with a negative decision relating to a request from a user device to access the computing network through a wireless gateway, wherein an attribute, of the set of attributes, indicates a software version of a software package used by the user device;

encoding, using an encoding-decoding system, the set of attributes into a latent representation;

inputting the latent representation into a machine learning model of a data processing system trained to output a corresponding change value when a particular latent representation is input into the machine learning model, wherein each change value represents a minimum change needed to be made to the set of attributes to change the negative decision to a positive decision;

obtaining, from the machine learning model, an associated change value for the set of attributes;

applying the associated change value to the latent representation to generate an updated latent representation;

decoding, using the encoding-decoding system, the latent representation into an updated set of attributes, wherein an updated attribute, of the updated set of attributes, indicates an updated software version of the software package; and transmitting, to the user device, the updated software version of the software package for installation on the user device for the user device to access the computing network.

6. The method of claim 5, further comprising:

receiving a training dataset comprising a plurality of records, wherein each record comprises a plurality of attributes of a corresponding user, and wherein each record is associated with a corresponding negative decision received from an automated system based on a corresponding plurality of attributes;

encoding the plurality of records into a plurality of latent representations;

generating, for the plurality of latent representations, a plurality of change values, wherein applying a change value to a corresponding latent representation having the corresponding negative decision causes the latent representation to now have a corresponding positive decision; and training, using the plurality of latent representations and the plurality of change values, the machine learning model to output a corresponding change value for a received latent representation.

7. The method of claim 6, wherein generating, for the plurality of latent representations, the plurality of change values comprises:

retrieving a plurality of positive latent representations, wherein each latent representation of the plurality of positive latent representations is associated with attributes known to receive the positive decision from the automated system;

determining an average latent representation from the plurality of positive latent representations; and generating a training change value based on the average latent representation and each of the plurality of latent representations.

8. The method of claim 6, wherein generating, for the plurality of latent representations, the plurality of change values comprises:

inputting into a latent representation generating machine learning model a first set of attributes, wherein the latent representation generating machine learning model has been trained to generate latent representations for attribute sets associated with positive decisions of the automated system, and wherein the first set of attributes is associated with the negative decision of the automated system;

obtaining from the latent representation generating machine learning model, a first latent representation for the first set of attributes; and generating a training change value based on the first latent representation and each of the plurality of latent representations.

9. The method of claim 5, wherein applying the associated change value to the latent representation to generate the updated latent representation comprises performing a linear interpolation operation based on the associated change value, the latent representation and a given latent representation having the positive decision.

10. The method of claim 5, wherein encoding the set of attributes into the latent representation comprises compressing the set of attributes into a multi-dimensional value.

11. The method of claim 5, further comprising:

determining that the updated latent representation requires the user device to change an attribute that is not changeable; and in response to determining that the updated latent representation requires the user device to change the attribute that is not changeable, applying a different associated change value to the latent representation.

12. One or more non-transitory, computer-readable media for updating sets of attributes, storing instructions that, when executed by one or more processors, cause the one or more processors to perform operations comprising:

receiving a set of attributes associated with a negative decision relating to a request from a user device to access a computing network;

encoding, using an encoding-decoding system, the set of attributes into a latent representation;

inputting the latent representation into a machine learning model trained to output a corresponding change value when a particular latent representation is input into the machine learning model, wherein each change value represents a minimum change needed to be made to the set of attributes to change the negative decision to a positive decision;

obtaining, from the machine learning model, an associated change value for the set of attributes;

applying the associated change value to the latent representation to generate an updated latent representation;

decoding, using the encoding-decoding system, the latent representation into an updated set of attributes; and transmitting, to the user device, software based on the updated set of attributes for installation on the user device for the user device to access the computing network.

13. The one or more non-transitory, computer-readable media of claim 12, wherein the instructions further cause the one or more processors to perform operations comprising:

receiving a training dataset comprising a plurality of records, wherein each record comprises a plurality of attributes of a corresponding user, and wherein each record is associated with a corresponding negative decision received from an automated system based on a corresponding plurality of attributes;

encoding the plurality of records into a plurality of latent representations;

generating for the plurality of latent representations a plurality of change values, wherein applying a change value to a corresponding latent representation having the corresponding negative decision causes the latent representation to now have a corresponding positive decision; and training, using the plurality of latent representations and the plurality of change values, the machine learning model to output a corresponding change value for a received latent representation.

14. The one or more non-transitory, computer-readable media of claim 13, wherein the instructions for generating, for the plurality of latent representations, the plurality of change values further cause the one or more processors to perform operations comprising:

retrieving a plurality of positive latent representations, wherein each latent representation of the plurality of positive latent representations is associated with attributes known to receive the positive decision from the automated system;

determining an average latent representation from the plurality of positive latent representations; and generating a training change value based on the average latent representation and each of the plurality of latent representations.

15. The one or more non-transitory, computer-readable media of claim 13, wherein the instructions for generating, for the plurality of latent representations, the plurality of change values further cause the one or more processors to perform operations comprising:

inputting into a latent representation generating machine learning model a first set of attributes, wherein the latent representation generating machine learning model has been trained to generate latent representations for attribute sets associated with positive decisions of the automated system, and wherein the first set of attributes is associated with the negative decision of the automated system;

obtaining from the latent representation generating machine learning model, a first latent representation for the first set of attributes; and generating a training change value based on the first latent representation and each of the plurality of latent representations.

16. The one or more non-transitory, computer-readable media of claim 12, wherein the instructions for applying the associated change value to the latent representation to generate the updated latent representation further cause the one or more processors to perform a linear interpolation operation based on the associated change value, the latent representation and a given latent representation having the positive decision.

17. The one or more non-transitory, computer-readable media of claim 12, wherein the instructions for encoding the set of attributes into the latent representation further cause the one or more processors to compress the set of attributes into a multi-dimensional value.

18. The one or more non-transitory, computer-readable media of claim 17, further comprising applying the associated change value to each dimension of the multi-dimensional value.

19. The one or more non-transitory, computer-readable media of claim 12, wherein the one or more processors are further configured to perform operations comprising:

determining that the updated latent representation requires the user device to change an attribute that is not changeable; and in response to determining that the updated latent representation requires the user device to change the attribute that is not changeable, applying a different associated change value to the latent representation.

20. The one or more non-transitory, computer-readable media of claim 12, wherein the software is a software version of a software package, used by the user device, based on the updated set of attributes.

* * * * *